United States Patent [19]

Silvera

[11] Patent Number: 5,015,377

[45] Date of Patent: May 14, 1991

[54] PLANAR PLURAL TUBULAR FILTER ARRAY

[75] Inventor: Robert K. Silvera, Round Lake, N.Y.

[73] Assignee: Polyset Company, Round Lake, N.Y.

[21] Appl. No.: 307,776

[22] Filed: Feb. 8, 1989

[51] Int. Cl.$^5$ .................. B01D 25/02; B01D 27/08
[52] U.S. Cl. ......................... 210/323.2; 210/488; 210/495; 55/497; 55/500; 55/511; 55/DIG. 31
[58] Field of Search ............ 210/321.82, 321.88, 210/321.89, 323.2, 488, 495; 55/497, 500, 511, DIG. 31

[56] References Cited

U.S. PATENT DOCUMENTS

| | | | |
|---|---|---|---|
| 2,076,304 | 4/1937 | Strindberg | 183/71 |
| 2,079,297 | 5/1937 | Manning | 183/69 |
| 2,354,931 | 8/1944 | Tolman | 55/DIG. 31 |
| 2,885,026 | 5/1959 | DiVette | 183/7 |
| 2,980,208 | 4/1961 | Neumann | 183/71 |
| 3,031,827 | 5/1962 | Onstad | 55/526 |
| 3,099,547 | 7/1963 | Hagendoorn et al. | 55/DIG. 31 |
| 3,156,950 | 11/1964 | Walton, Jr. | 210/495 |
| 3,330,101 | 7/1967 | Murphy, Jr. | 55/484 |
| 3,491,891 | 9/1967 | Krizman, Jr. | 210/483 |
| 3,502,596 | 3/1970 | Sowards | 252/477 |
| 3,594,989 | 7/1971 | Bastiaans | 55/142 |
| 3,707,831 | 1/1973 | Dautzenberg | 55/493 |
| 3,766,629 | 10/1973 | Lechtenberg | 29/412 |
| 3,880,626 | 4/1975 | Griwatz | 55/485 |
| 3,883,331 | 5/1975 | Bernard | 55/381 |
| 3,951,626 | 4/1976 | Carey | 55/DIG. 31 |
| 4,227,953 | 10/1980 | Wasielewski et al. | 55/DIG. 31 |
| 4,233,044 | 11/1980 | Allan | 55/355 |
| 4,343,631 | 8/1982 | Ciliberti | 55/302 |
| 4,363,644 | 12/1982 | Sato | 55/523 |
| 4,530,418 | 7/1985 | Currie | 181/227 |
| 4,584,005 | 4/1986 | Allan | 55/499 |
| 4,600,419 | 7/1986 | Mattison | 55/484 |
| 4,613,438 | 9/1986 | DeGraffenreid | 210/323.1 |
| 4,639,261 | 1/1987 | Pittman | 55/502 |
| 4,640,779 | 2/1987 | Taki | 210/493.5 |
| 4,685,944 | 8/1987 | Allan | 55/491 |
| 4,689,059 | 8/1987 | Magdelain | 55/382 |
| 4,734,195 | 3/1988 | Lhuillier | 210/493 |

Primary Examiner—Richard V. Fisher
Assistant Examiner—Wanda L. Millard
Attorney, Agent, or Firm—Schmeiser, Morelle & Watts

[57] ABSTRACT

A high efficiency filter and method for its production. An array of tube-type sleeves, each sleeve composed of a filtering medium and joined longitudinally along its exterior surface to the adjacent sleeve, is expandably fixed into a framework and all margins of the array are sealed to the framework in order that a fluid passing orthogonally through the plane of the array and its frame must pass through at least two filtering surfaces. The process and machine used to make the aforementioned product start with a relatively narrow roll of filtration media and, through a series of steps, form, cut and glue the media so as to form the requisite sleeve structure and then by means of controlled curing, affix a predetermined number of the sleeves in to the desired array.

3 Claims, 3 Drawing Sheets

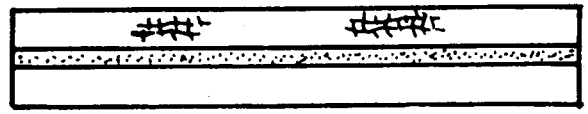
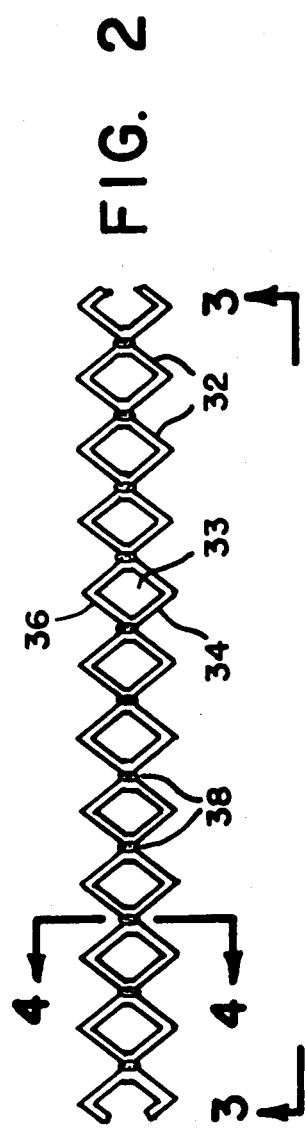
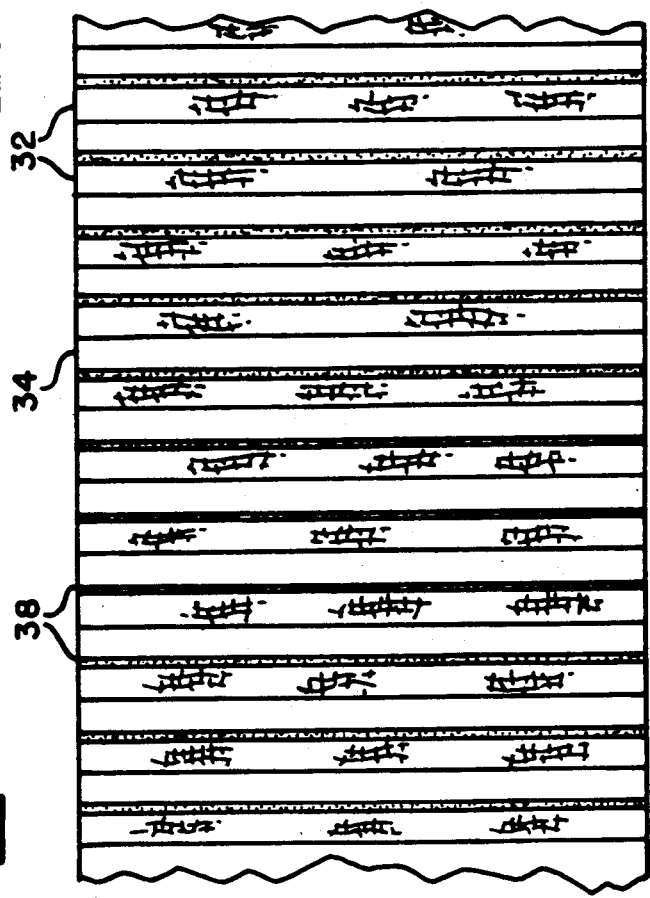

5,015,377

PLANAR PLURAL TUBULAR FILTER ARRAY

BACKGROUND OF THE INVENTION

The present invention relates generally to high efficiency filters and filtering processes and more particularly to filtering of fine particles from fluid streams. It relates also to the form of the high efficiency filters and to the manner of their manufacture.

The design of filters to remove particulate material from gases is known to depend on the temperature and compositions of the gases containing the particles and on the size and character of the particles to be removed.

The removal of fine particles of coal, carbon and ash from hot gas entering a gas turbine through use of ceramic filters to prevent damage to turbine blades is taught in U S. Pat. No. 4,343,631. Numerous other patents teach specific filter structures useful in separating designated materials from specified fluid streams. Such patents include U.S. Pat. Nos. 3,880,620; 4,530,418; 4,734,195; 3,707,831; 3,031,827; 3,766,629; 4,363,644; 4,689,059; 3,491,891; 4,640,779; 3,502,596; 2,076,304; 3,330,101; 4,613,438; 3,883,331; 2,885,026; 3,594,989; 4,639,261; 4,584,005; 4,685,944; 4,233,044 and 2,980,208. A number of these patents disclose a filter structure involving a honeycomb like array of filter elements or filter channels. However in essentially all such filter elements the design of the filter is for a fluid flow parallel to the axis of the honeycomb. The subject application deals with a filtering structure and filtering operation in which the filtering occurs in a direction perpendicular to the axis of the cells of a cellular structure such as a honeycomb.

A set of standards has been established for the operation of filters in removing finer and finer particles from gas. This standard has been set with respect to clearing the air for so-called clean room operations. The standard is known as Federal Standard 209B and it is entitled "Clean Room and Clean Work Station Requirements, Controlled Environment". The standard was established partly in connection with clean room operations used in forming microelectronic chips because of the negative impact of air borne dust particles on the manufacture and on the operation of such chips. The standard contains a number of criteria. Some of these criteria have to do with the number and size of particles which must be removed from air and conversely the number and size of particles which may remain in the air of a "clean room." Recently there have been a number of studies and proposals relating to the modification of the standard and a new standard, FED-STD-209D dated June 1988 has been published. A copy of the standard, amounting to some 41 Pages, was published in the Journal of Environmental Science of Sept/Oct 1988.

Some of the filters which are used in connection with establishing a clean room atmosphere are known as HEPA (or High Efficiency Particulate Air) filters. There are carefully drawn criteria about how such filters are to be operated and the ability which they must display for removing particles of prescribed sizes from air. One of these criteria is that the resistance to airflow of the filters at prescribed airflow should not be more than 1.0 inch of water except for filters which have an efficiency of 99.999% and for these latter filters the pressure drop is established by agreement of buyer and seller.

A HEPA filter is defined by the standard as a throwaway extended-media dry-type filter in a rigid frame having minimum particle collection efficiency of 99.97% for 0.3 micrometer thermally-generated dioctyl phthalate (DOP) particles, and a maximum clean-filter pressure drop of 1.0 in. water gage, when tested at rated air-flow capacity.

Another type of filter is known as an ASRAE filter and still another is known as a UPLA (Ultra Low Particle Air) filter. Another filter is known as the ULPA filter (or Ultralow Penetration Air Filter). Each of these filters has well defined and well recognized characteristics which are well known in the trade.

One characteristic which is shared by all of these filters is that each such filter has just one filter media layer. The subject invention concerns a new and unique multilayer filter media system for the above applications which has two or more layers of filter media.

BRIEF STATEMENT OF THE INVENTION

It is accordingly one object of the present invention to improve the efficiency of such filters.

Another object is to provide a filter in which only the filter media are present and there is no need for separators of a different material which may be regarded as a foreign material.

Other objects will be in part apparent and in part pointed out in the description which follows.

In one of its broader aspects these and other objects of the invention may be achieved by providing a high efficiency filter comprising at least one high efficiency filter media in a planar form, said high efficiency filter media being formed into a generally planar array of longitudinally connected tubular members, said planar array having two outer edges of tubular openings and two outer edges of tubular sides, a self supporting frame member having a thickness dimension at least equal to that of said array and being adapted to the passage of fluid therethrough, said planar array of tubular members being mounted within said frame member and the outer tube openings and the outer tube sides of said array being sealed to the inner surfaces of said frame member, the tubular form of said filter media rendering said media essentially self supporting within the frame within which said media is sealed, whereby any fluid which passes through said frame must pass through at least two layers of the filter media of said tubular members.

In another of its broader aspects the objects may be achieved by providing a set of tubular members formed of a filter media, the members of said set being aligned in parallel to form a generally planar array of tubular members, said planar array being housed within a frame having cross members extending generally transversely of said tubular members and end members extending generally parallel to said tubular members, each member of said set being bonded and sealed at its respective ends to the cross members of said frame to be thereby supported within said frame, the inner members of said set being bonded and sealed along their lengths to adjacent members of said set, and the outer members of said set being bonded and sealed along their lengths to the end members of said frame to thereby present a tubular surface to any fluid passing through said frame.

In another of its broader aspects the objects may be achieved by providing a filter media in flat strip form, forming the filter media strip into a flattened tubular form to have first and second flat sides, placing at least one thin stripe of activatable adhesive down the first side of the flattened tubular media, cutting the tubular media into pieces of predetermined length, activating the adhesive on the first side of a first piece and bonding it to a first frame member, activating the adhesive on the first side of a second piece and bonding it to the second side of the first piece, repeating the activation and bonding until a predetermined number of flattened tubular media pieces have been bonded together to form a stack of said tubular media pieces which stack is bonded to said first frame member, expanding the stack of tubular pieces to open the tubular pieces of said stack and to form a filter media of expanded tubular pieces having open ends, bonding the second side of the last piece of said expanded stack to a second frame member disposed opposite said first frame member, providing top and bottom connecting frame member pieces, joining the top and bottom frame members to the first and second frame members to form a complete frame about the expanded stack of bonded filter media tubes, and bonding the respective open ends of the filter media tubes to the respective top and bottom frame members to form thereby a continuous multilayer wall of filter media within said frame and to present said multilayer wall of filter media to any fluid passing through said completed frame.

BRIEF DESCRIPTION OF THE DRAWINGS

In the description which follows the invention will be understood with greater clarity if the description is read in connection with the accompanying drawings in which:

FIG. 2 is a fragmentary sectional view through a portion of a cellular filter media similar to that of the mechanism of FIG. 1.

FIG. 3 is a vertical elevational view of the fragment of cellular filter media of FIG. 2.

FIG. 4 is a top plan view of the fragment of cellular filter media of FIG. 2.

DETAILED DESCRIPTION OF THE INVENTION

The filter media which may be used in connection with forming the structures of the present invention is filter media in planar form which is commercially available. Some such filter media is available in sheet form. Other filter media is available in strip form. In either case the filter media has the planar configuration which is the essential starting form for the media for use in connection with the present invention. It is essential that the media have this starting planar form as this is the form which can then be manipulated and configured into the structures of the present invention. A great deal of information concerning the filter media and their preparation and use and testing is available in the technical literature and in advertisements in the technical literature concerning filter media in planar form which may serve as a starting material for practice of the present invention. For example The Journal Of Environmental Sciences has articles and advertisements which are helpful in this regard. An example of such an advertisement is one by the Filtra Corporation of Hawthorne, New Jersey appearing in the September/October 1988 issue of the Journal. Other information relevant to the making and testing of filters is contained in the reports of recent conferences such as the 1988 Proceedings of the Institute of Environmental Sciences at the 34th Annual Technical Meeting of the Institute at King of Prussia, Pa. Another source of such information is the Proceedings of the 9th International Symposium on Contamination Control, hosted by the Institute of Environmental Sciences in Los Angeles, Calif. in September 1988. These and other sources of similar information permit one skilled in the art to obtain the high efficiency filter media which are the starting material for forming the structures of the present invention.

Figure 1:
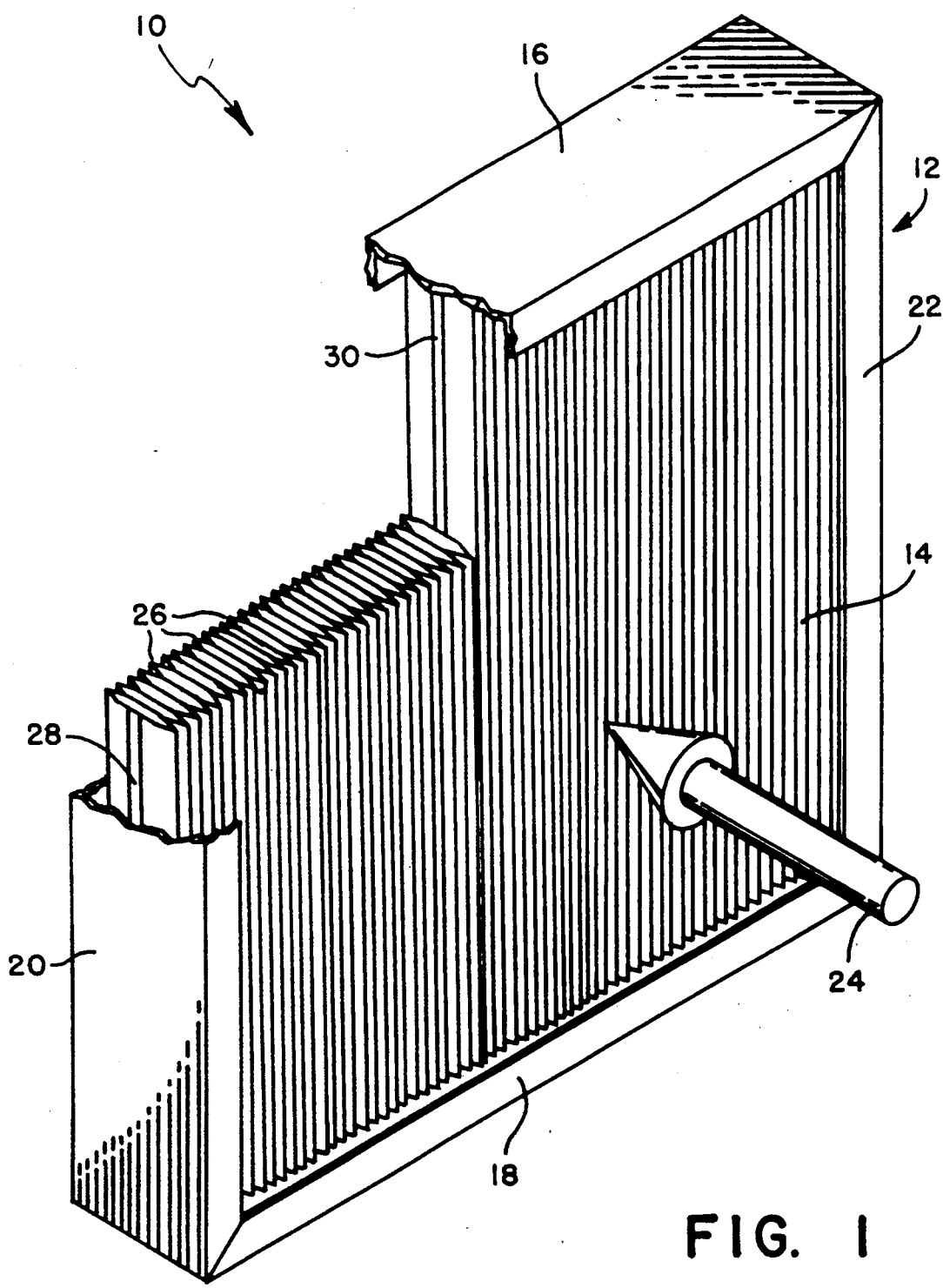
FIG. 1 is an isometric illustration, in part cut away, of a filter mechanism as provided pursuant to the present invention, including a cellular filter media mounted within a frame.

Turning now to the structures themselves, one such structure is illustrated in FIG. 1. The structure is a high efficiency filter 10 having a outer frame 12 and an assembly of inner cellular filter elements 14, which assembly is in a generally planar configuration. The frame has upper 16 and lower 18 frame members and has two side members 20 and 22. The frame is adapted to have a fluid, such as air, flow through its interior. The arrow 24 shows the direction of movement of a gas fluid through the frame and accordingly through the cellular filter structure.

The cellular filter structure itself is made up, as is evident from the cut away corner portion of the frame, of a number of flat tubular cells or tubes 26. Each tube extends all the way from the top frame member 16 to the bottom frame member 18. The ends of the tubes, and the openings of the ends of the tubes, are sealed to the inner surfaces of the top and bottom frame members 16 and 18 respectively.

It is also evident from FIG. 1 that each of the tubular members of the array within the frame 12 is of a generally flattened configuration and that each flattened tube has at least one stripe such as 28 or 30 extending down the side where it contacts the adjacent tube. In fact the two parallel lines 28 or 30 of FIG. 1 are preferably two parallel stripes of adhesive which are described more fully below in connection with the apparatus of FIG. 5.

The flattened configuration of the tubes such as 26 is preferred as it places more surface of the filter media in the path of the gas passing through the frame. In addition the tubular or cellular form of the media imparts a measure of a self supporting characteristic to the media. For this reason relatively large filter elements can be formed in the type of configuration shown in FIG. 1 without the need for supplemental support elements such as stays or support brackets. Accordingly there is no foreign support material within the frame and the filter structure illustrated in FIG. 1 is capable of self support although essentially the entire frame 12 is filled with filter media. Considering next the stripes of adhesive 28 and 30 these stripes may be applied to each of the flattened sides of the tube and this adhesive serves as the means by which the tubes are joined together into a generally planar array of tubes as illustrated in the figure. If each of the individual tubes is a complete and sealed enclosure of media then the tubes actually need have only a single stripe of adhesive as the single stripe is used to bond to the adjacent tube and so two tubes can be joined by a single adhesive stripe. However if the tubes are formed by folding a flat strip of media as explained below in relation to FIG. 5 then one stripe of adhesive must be affixed to each of the folded edges of the strip.

For a set of tubes each of which has been preformed into a closed tubular form only one stripe of adhesive is needed to join the tube to the adjacent tube. Accordingly the only tube which needs two stripes of adhesive is the last tube of the array which is to be joined to the frame. The ends of the tubes at both ends are adhesively joined to the frame. This joining of the ends has the effect of greatly strengthening the overall structure and adding to the self supporting aspect of the structure.

The filter structure as provided pursuant to the present invention is illustrated in isometric fashion in FIG. 1. However it will be understood that the individual tubular elements of the array which is contained within the frame need not have exactly the same configuration as those illustrated in FIG. 1. Referring now next to FIG. 2 an alternative form of a cellular array of tubes is illustrated.

FIG. 2 might be regarded as a horizontal section through a portion of the tubular structure 26 of FIG. 1. However it is more aptly described as a horizontal section through a semi-schematic grouping of joined filter tubes or, more properly, filter cells. In this semi-schematic rendering each cell 32 is formed of a filter media. Each cell may be of the specific form illustrated in FIG. 1, but alternatively such cells may have a closed cell form as representatively illustrated by the cells 32 of FIG. 2. Pursuant to the present invention the cells must present a multilayer structure to the passage of gas and the filtering action must take place at both of the at least two media layers through which the gas must pass. In this respect for a cell such as 33 of FIG. 2 the gas must pass through filter media layers 34 and 36. The media may be shaped in the flat tubular form such as 26 of FIG. 1 or it may be round or it may be in the diamond shape such as 32 or 33 of FIG. 2. In any case the gas passing through the filter passes through at least two filter media layers. Pursuant to one method of the present invention the cells of the structure are held together by a bead or stripe of adhesive such as 38 of FIG. 2. A similar stripe, or set of stripes, of adhesive 30 holds the media cells together in the structure of FIG. 1. The adhesive also bonds and secures the assembled array of cells to any frame member which surrounds or at least partially surrounds the array of filter media.

Referring now next to the FIGS. 3 and 4, these two figures contain illustrations of other views of the pleated cellular structure illustrated in FIG. 2. FIG. 3 is an elevational view taken along the line 3—3 of FIG. 2 and FIG. 4 is a top plan view taken along a line such as 4—4 of FIG. 2. The numbered elements of FIG. 3 correspond to the elements bearing the same numbers in FIG. 2.

Figure 5:
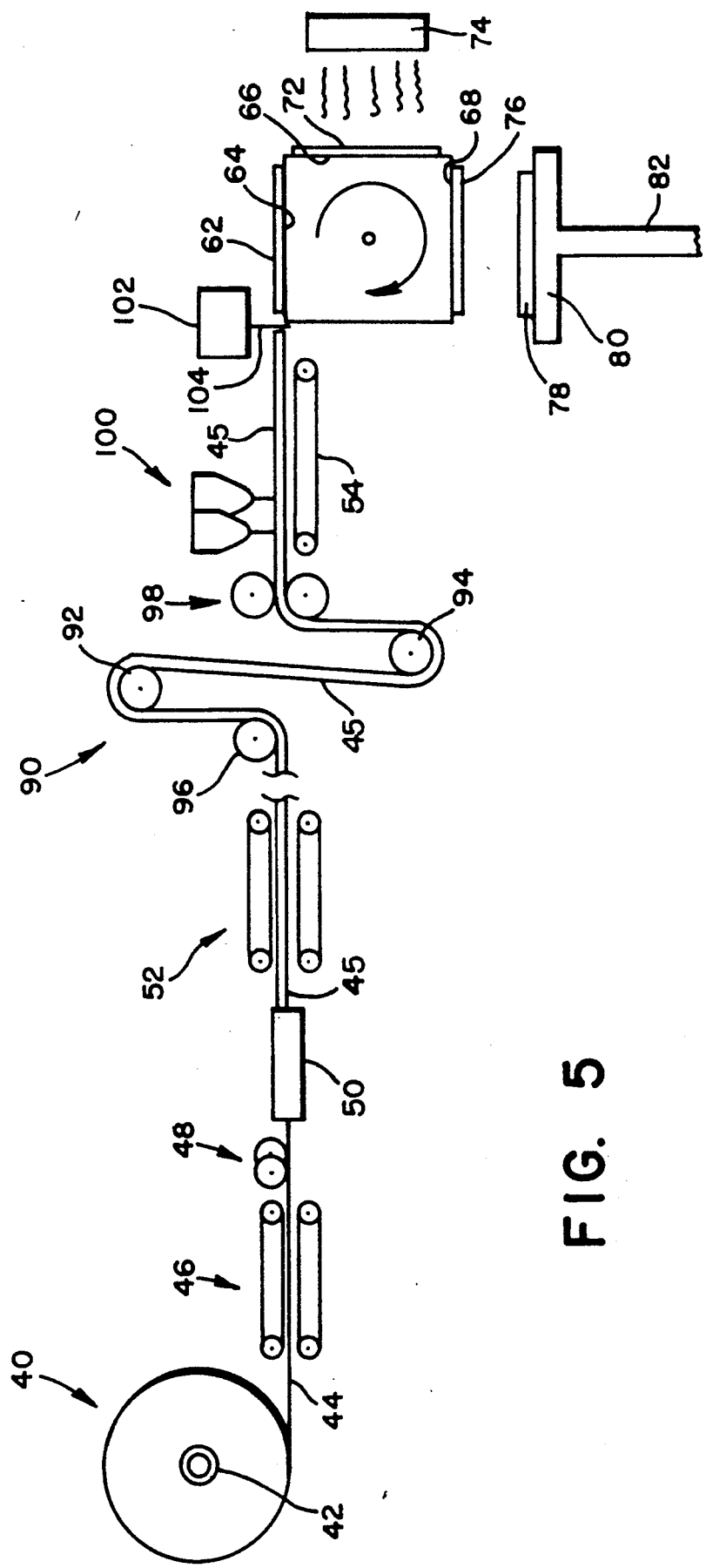
FIG. 5 is a semi-schematic illustration of a mechanism for forming tubular cellular filter media as illustrated in FIGS. 1 through 4.

Another novel aspect of the present invention lies in the method by which the filter structures of the present invention are made. In order to explain the method of manufacture reference is now made to FIG. 5. FIG. 5 contains a semi-schematic illustration of a mechanism for making a fluted cellular media structure as illustrated in FIG. 1. Starting at the left hand side of the figure a spool 40 of a strip form of flat stock filter media is provided. The spool is mounted on a core 42 which may be in turn mounted on a dispensing rod not shown. The rod may be art of a dispensing mechanism of conventional form which is also not shown as it forms no part of this invention. A single strip 44 of the filter media is dispensed from the spool, as illustrated in the figure, and passes to a pair of flat drive belts 46 of conventional form. The drive belts advance the strip 44 to a pair of scoring wheels 48. The scoring wheels score two lines or depressions in the flat stock so that the stock can be easily and reliably folded along the scored lines into a tubular shape by a shaping form 50. In this mode of practicing the invention the two outer edges of the strip are folded first upwardly and then inwardly. When the folding is complete the two outer edges of the strip are thus brought together above the mid section of the strip. In making the fold in this fashion the two edges may just reach each other and may be thus abutted. Alternatively the two edges may be overlapped. As a further alternative the two edges may be folded in toward each other but may be slightly spaced from each other when in their final position.

The movement of the media strip past the scoring wheels and through the shaping form is controlled by the second pair of flat drive belts 52 which work in conjunction with the first pair of drive belts 46 to keep a slight tension on the strip extending between the two pairs of drive belts.

While the operation of this part of the apparatus of FIG. 5 is continuous the operation of the remaining portion of the apparatus is intermittent as is now explained. The strip 44 is supplied continuously from spool 40 and the folded strip 45 is supplied continuously through the pair of drive belts 52. But the strip is cut into lengths in the right hand half of the apparatus and the cut lengths are individually treated and assembled into a structure as illustrated in FIG. 1. To accommodate the intermittent motion of the folded strip 45 in the operations on the right hand side of the apparatus of FIG. 5 a conventional set of idler rollers 90 is provided. The two idler rollers 92 and 94 are adapted to move up and down in conventional fashion to take up and to pay out the folded strip 45. The guide roller 96 and the pair of guide rollers 98 assist in feeding the strip 45 through the idler roller arrangement and on to the next station. The next station has a flat drive belt 54 operating beneath a pair of glue heads 100. The drive belt 54 and the glue heads 100 are designed to prepare a length of folded strip for mounting onto a rotating box 60 as explained more fully below. The movement of the strip by the drive belt 54 is responsive to the turning of the box 60 and occurs only when the box presents an empty surface at its top. Similarly the adhesive is dispensed from the glue heads 100 only when the drive 54 is moving. After a length of the folded strip is glued and moved partially into place on the top of box 60 a cut is made by the blade 104 extending downwardly from the cutting activating box 102. Once the cut is made and the knife is withdrawn the cut piece 62 is pushed into its place on top of box 60 by the advancement of the end of the folded strip 45.

Accordingly after the folded strip 45 passes from the second pair of drive belts 52 and through the idler roller mechanism 90, the strip 45, which may be considered as a flattened tube, passes onto and over a single flat drive belt 54 and under a pair of glue heads 56. The glue heads dispense two streams of an activatable form of adhesive. For example the adhesive dispensed from the heads 56 may be activatable by light. Such activatable forms of adhesive are commercially available.

One of the two streams of adhesive is dispensed onto each of the folded edges of the strip to form a bead of adhesive on each folded edge. If the surface which has received the adhesive is considered the top of the folded media tube and the surface of the media tube which rests on the moving belt 54 is considered the bottom of the folded media tube, then in order to construct the cellular filter structure as illustrated in FIG. 1 the top of one folded media tube is bonded to the bottom of the next folded media tube in the assembly. In this way when two of the individual folded media tubes are bonded together the bonding occurs along the two lines of adhesive on the top of one tube and the bonding is to the bottom of the other tube. In this way the space within each tube is sealed from the space within its adjoining tube by at least one layer of media.

In the case in which the two edges of a folded media strip adjoin but do not touch, a sealed tube is formed when the top of a first folded media strip is bonded to the bottom of the adjacent and second folded media strip of a set of such strips. Thus even though the two folded edges of the first strip are separated by a small distance, after the two beads of adhesive are bonded to the bottom of the adjoining strip the space between the two edges is closed to form a tube by the bonded bottom of the second and adjoining strip.

Referring now again to FIG. 5 as the adhesive bearing flattened strip (or tube) of media 45 passes from the moving belt 54 it passes to a cutter station and system 100 where it is repeatedly and automatically cut to a predetermined length in synchronization with the movement of a rotating box 60.

Prior to the cutting a length of the strip 45 extends out from the single drive belt 54 and passes onto the upper surface of a rotating box 60. Once the cut is made a single piece 62 cut from the strip 45 and bearing the two stripes of photoactivatable glue is disposed on the upper surface 64 of the square box 60. The rotating box 60 is essentially a hollow box having four internal compartments communicating with its four outer faces. Each of its outer faces has formed therein a number of small openings. By selectively withdrawing air from one of the chambers communicating with a selected set of these openings the cut lengths of folded filter media can be held in place on one of the box surfaces as long as the air is being withdrawn. By properly sequencing the movement of the cut strips, the adhesive is activated at one station and the cut length is assembled into the cellular filter media at another station as explained more fully below. The overall result of these operations is the formation of a structure as illustrated in FIG. 1.

Once the cut length of folded media strip 62 is in place on the upper surface of the box 60 vacuum is applied (air is withdrawn) to hold the strip 62 to the upper surface 64 of box 60. In FIG. 5 a previously cut piece 72 is also shown to be held in place on surface 66 of box 60 by suction. The two adhesive stripes on the surface of cut piece 72 receive ultraviolet radiation from UV light source 74. This activates the adhesive and converts it to a glue.

A third cut piece of folded media strip 76 is also shown held by suction to the lower surface 68 of box 60. This piece has the adhesive activated and is ready to be bonded to an assembly of such pieces. The bonding takes place automatically as is now explained.

A side 78 of a filter frame, such as that illustrated in FIG. 1, is disposed on support surface 80 of a ram 82. The ram 82 is activated by a conventional sequencing mechanism, not shown and forming no part of this invention, to rise when the rotating box 60 comes to a stop with a cut length of media 76 held by vacuum on its bottom surface 68. The ram 80 is of conventional design and is driven by air pressure. The travel of the ram is adjusted so that the distance it travels is determined by the resistance which it encounters to its travel. As the ram 82 travels upward it carries the filter frame side 78 into contact with the length 76 of folded filter media bearing the activated adhesive. On making contact with the adhesive on the media strip the strip 76 becomes bonded to the frame member 78. The ram 82 retracts and the rotary box 60 indexes one quarter of a turn to bring the media strip 72 to the bottom position. This quarter turn rotary motion also brings the cut length 62 of folded filter media to the vertical position facing the UV light source 74. It also permits a new cut length of folded filter media to be placed on the upper surface of the box 60 after movement from cutter station 102. This rotary motion also rotates the cut length of folded filter media 72 into position to be bonded to the back of the cut length 76 as the ram 82 again moves the support member 80 up to bring the frame member 78, with the cut piece of folded filter media 76 bonded thereto, into contact with the piece 72 held to the lower surface of the rotary box 60 by suction.

As the sequential quarter rotations of box 60 occur, and as the adhesive bearing folded media strips are delivered and bonded to the set of such folded media strips on the filter frame, there is built up on the filter frame member 78 a tubular filter media such as that depicted in FIG. 1. The individual tubes of this filter media correspond to the tubular elements 26 of the assembly 14. During the formation of the assembly on the ram platform 80 side guides, not shown, may be employed to keep the incrementing assembly in alignment so that the final product will have the generally planar configuration of the assembly 14 of FIG. 1.

While the foregoing presents a reliable process of forming a filter cellular media as illustrated in FIG. 1, variations may be made in one or more of the process steps without departing from the invention which is taught herein. For example the above method describes a method for folding a filter media strip and administering adhesive to both folded edges of the strip. An alternative method involves folding the flat single layer media strip such as 44 of FIG. 5 into the folded media strip 45 so that the two edges of the flat strip are made to overlap. The overlapped edges are then sealed together. For a suitable filter media such a sealing may be accomplished as the media strip is folded at the shaping form 50 of FIG. 5 as by ultrasonic bonding. When such tubes are formed with such overlapped and sealed edges, then only one stripe of adhesive is needed to bond one such tube to an adjacent tube in an array of tubes such as that illustrated in FIG. 1. Other modifications of the articles and methods of the present invention which fall within the scope of the present invention will also be apparent to those skilled in the art based on the teaching which is set forth above.

What is claimed and sought to be protected by Letters Patent of the United States is as follows:

1. A high efficiency filter comprising a set of porous tubular members formed of a filter media, the members of said set being aligned in parallel to define a generally planar array of tubular members with the planar array aligned and disposed in a frame so as to present a generally planar face orthogonal to a fluid stream passing through said frame, said frame having cross members extending generally transversally of said tubular members and end members extending generally parallel to said tubular members, thereby confining a fluid stream passing through said array to passage normal to said planar face of said array and within and through said frame, each member of said set bonded and sealed at its respective end to the cross members of said frame to be thereby supported within said frame, inner members of said set being bonded and sealed along their lengths to adjacent members in said set, and outer members of said set being bonded and sealed along their lengths to the end members of said frame to thereby present a tubular surface to any fluid stream passing through said frame, and further, said set of tubular members is formed from lengthwise-folded strips of said filter media by bonding each edge of a folded strip to the back of an adjacent strip.

2. A high efficiency filter comprising:
   a generally planar array of tubular members, each said member formed from a longitudinally folded elongate strip of filter media and having a longitudinal front margin edge and a back surface, said members longitudinally concatenated to each other by adhering a longitudinal front margin edge of a tube member to a back surface of an adjacent tube member, said array disposed in and marginally bonded and sealed to a framework; and a framework comprising a first pair of non-porous members disposed transversally to the tubular members and a second pair of non-porous members disposed parallel to the tubular members and attached to the first pair to form therebetween an essentially quadrilateral shape, whereby said planar array disposed within said framework allows the presentation of a closed pleated array surface normal to the flow of a fluid stream passing through said framework.

3. In a high efficiency filter which presents an array of tubes made of filter media to a fluid stream for filtration thereof, the improvement comprising:
   a single, essentially planar array of tubes made of suitable filter media that defines a set of multiple singular tubes bonded one to the other along the lengths thereof, said array further bonded and sealed along the top, bottom and lateral margins thereof to a framework for orientation within a fluid stream; and a framework for bonding therein said essentially planar array so as to present a plane of joined tube surfaces normal to said fluid stream.

* * * * *